United States Patent [19]

Hirota

[11] Patent Number: 5,239,164
[45] Date of Patent: Aug. 24, 1993

[54] HEATER CONTROL APPARATUS FOR PRINTERS

[75] Inventor: Tetsuroh Hirota, Hadano, Japan

[73] Assignee: Ricoh Company, Ltd., Tokyo, Japan

[21] Appl. No.: 695,436

[22] Filed: May 3, 1991

[30] Foreign Application Priority Data

May 9, 1990 [JP] Japan .................................. 2-120899

[51] Int. Cl.$^5$ .............................................. H05B 1/02
[52] U.S. Cl. .................................... 219/492; 219/486;
219/485; 307/41; 323/235
[58] Field of Search ............... 219/492, 497, 483, 485,
219/486; 323/235, 236; 307/38-41

[56] References Cited

U.S. PATENT DOCUMENTS

| | | | |
|---|---|---|---|
| 2,904,703 | 9/1959 | Hall | 219/485 |
| 4,010,412 | 3/1977 | Forman | 219/486 |
| 4,138,607 | 2/1979 | Engelmann | 219/485 |
| 4,317,975 | 3/1982 | Mizukawa | 323/235 |
| 4,778,980 | 10/1988 | Rathbun | 219/497 |
| 4,920,252 | 4/1990 | Yoshino | 219/497 |
| 5,079,409 | 1/1992 | Takada | 219/497 |

Primary Examiner—Mark H. Paschall
Attorney, Agent, or Firm—Cooper & Dunham

[57] ABSTRACT

A heater control apparatus for use with a plurality of printers each having a heater, comprises a detection part for detecting occurrence of zero crossing of a voltage signal supplied from a power supply and for supplying a zero cross signal each time the zero crossing is detected, a signal part for detecting an ON state of a request signal, the request signal being turned ON when a heater of any of the plurality of printers is currently turned ON, a first control part for determining a delay time in accordance with a predetermined device number setting value such that a timing with which a heat-on signal is supplied to a heater of a subject printer lags by the determined delay time behind a timing with which the zero cross signal is supplied by the detection part, and a second control part for supplying a heat-on signal to the heater of the subject heater at a timing defined by the determined delay time only when the request signal is turned OFF, thereby preventing two or more heaters from being turned ON simultaneously.

14 Claims, 3 Drawing Sheets

HEATER CONTROL APPARATUS FOR PRINTERS

BACKGROUND OF THE INVENTION

The present invention relates generally to a heater control apparatus, and more particularly to a heater control apparatus for use with a plurality of printers connected to a host computer, which prevents two or more heaters of the plurality of printers from being turned ON so that the plurality of printers are kept from overload.

Conventionally, a halogen heater having a rated power load ranging from 500 W to 1000 W is commonly used as a fixing heater in a printer connected to a host computer including a personal computer. This fixing heater is provided for heating a fixing roller of the printer, and the fixing roller is heated when the fixing heater is turned ON at appropriate timings so that a surface of the fixing roller is maintained to a constant, suitable temperature. Although it is common that a single printer is connected to a personal computer, there are cases in which a plurality of printers connected to a host computer are installed in an office for business use. The printers of the type described above usually require a consumption current ranging from 5 A to 10 A while electric power from a commercial power supply of a rated voltage of 100 V a.c. is used. However, a normal power supply of a power distribution system for office use supplies the rated current of 20 A. Accordingly, in a case in which a plurality of printers are installed in an office for use with a host computer, it is necessary to reduce the number of printers being installed such that the total of consumption currents by the plurality of printers in operation falls within the range of permissible current which is supplied by such a normal power supply so as to prevent the above described overload problem from taking place due to several heaters of the printers being turned ON at the same time. Otherwise, it is necessary to change an office wiring construction so that the power supply may supply normally a greater capacity of the rated current to enable the plurality of printers connected to a host computer to be used without rendering the above described overload.

One conceivable method to eliminate the above described problem is to use a common signal line through which a plurality of printers are coupled one another to monitor the operating condition of each heater in the plurality of printers by checking the ON/OFF state of a request signal presented on the common signal line. This request signal is supplied from one printer among the printers when the heater of this printer is turned ON for heating the fixing roller of the printer being considered, so as to present to other printers the "ON" state of the heater of the printer being considered. However, the heaters of the printers are individually controlled by the respective printer controllers thereof so that the respective heaters are turned on and off separately at appropriate timings for maintaining a surface of the fixing roller of each printer constantly to a given suitable level. Thus, even if the above mentioned method is applied, there still remains a possibility that two or more heaters of the printers are turned ON simultaneously, thus rendering the overload problem, and the reliability of the printers connected to a host computer is still not at a sufficient level.

SUMMARY OF THE INVENTION

Accordingly, it is a general object of the present invention to provide a novel and useful heater control apparatus in which the above described problems are eliminated.

Another and more specific object of the present invention is to provide a heater control apparatus which allows the use of a plurality of printers connected to a host computer without rendering the overload problem to the printers due to two or more heaters being turned ON simultaneously. The above mentioned object of the present invention is achieved by a heater control apparatus which comprises a detection part for detecting occurrence of zero crossing of a voltage signal supplied from a power supply and for supplying a zero cross signal each time the zero crossing is detected, a signal part for detecting an ON state of a request signal, the request signal being turned ON when a heater of any of the plurality of printers is currently turned ON, a first control part for determining a delay time in accordance with a predetermined device number setting value such that a timing with which a heat-on signal is supplied to a heater of a subject printer lags by the thus determined delay time behind a timing with which the zero cross signal is supplied by the detection part, and a second control part for supplying a heat-on signal to the heater of the subject heater at a timing defined by the thus determined delay time only when the request signal is turned OFF, thereby preventing two or more heaters from being turned ON simultaneously. According to the present invention, it is possible to determine a timing with which a heat-on signal is transmitted to a heater of the respective printers, the timing being varied depending on the setting value of the dip switches. Therefore, it is possible to prevent several heaters from being turned ON simultaneously, thus the overload problem being eliminated.

Other objects and further features of the present invention will be more apparent from the following detailed description when read in conjunction with the accompanying drawings.

DESCRIPTION OF THE PREFERRED EMBODIMENT

Figure 1:
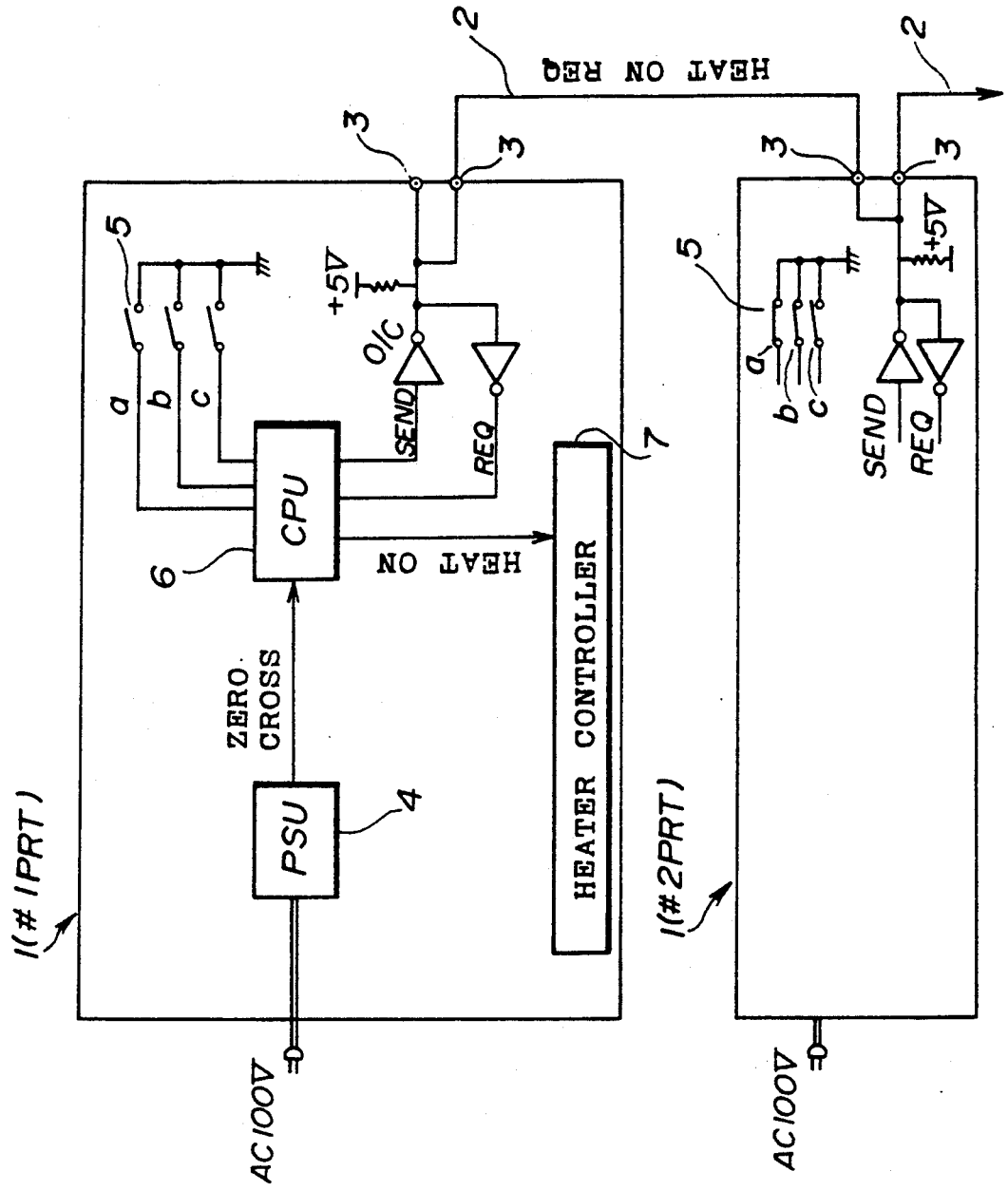
FIG.1 is a block diagram showing an embodiment of a heater control apparatus according to the present invention.

First, a description will be given of an embodiment of the heater control apparatus according to the present invention, with reference to FIG.1. In FIG.1, there are illustrated a plurality of printers 1 each having a device number assigned to the respective printers. For example, a first printer (#1 PRT) having a device number #1 and a second printer (#2 PRT) having a device number #2. Each of the printers 1 includes two connecting terminals 3 in which a coaxial cable 2 is plugged to connect one printer to another. For example, the first printer #1 PRT is connected to the second printer #2

PRT via the coaxial cable 2, one end of the coaxial cable 2 being plugged in a connecting terminal 3 of the printer #1 PRT with the other end being plugged in a connecting terminal 3 of the printer #2 PRT. The plurality of printers 1 each comprise a detection circuit (PSU) 4 being connected to a power supply via a terminal, a device number set switch 5, a central processor (CPU) 6 and a heater controller 7 leading to a heater of each printer, the device number set switch 5 being coupled to the central processor 6, the heater controller 7 being coupled to the central processor 6.

The detection circuit 4 detects the occurrence of zero crossing of a sine-wave voltage signal supplied to the printers 1 from the a.c. power supply, the a.c. power supply installed in an office usually supplying a rated supply voltage of 100 V a.c. Each time the sine-wave voltage signal of the rated supply voltage changes from a negative level to a positive level, a zero crossing of the rated supply voltage takes place periodically, as illustrated in the timing chart of FIG.2. The detection circuit 4 detects the occurrence of this zero crossing and supplies a zero cross signal to the central processor 6 at prescribed timings with which each detection of the zero crossing is made by the detection circuit 4. The device number set switch 5 is usually composed of a number of dip switches provided in each of the plurality of printers 1. The device number set switch 5 includes, for example, dip switches "a", "b", "c" as shown in FIG.1. The dip switches "a", "b", "c" of each printer are preset in accordance with the device number setting value of the switch 5, and the device number is assigned to the respective printers 1 as described above. In a case of the first printer 1 with the device number #1, the dip switches "a" to "c" of the device number set switch 5 are all switched OFF, and in a case of the second printer 1 the corresponding device number set switch 5 is preset with the dip switch "a" turned ON and the other dip switches "b" and "c" turned OFF. Such setting values of the device number set switch 5 are recognizable to the central processor 6, and the central processor 6 discriminates between the plurality of printers 1 by these device number setting values of the switch 5.

The central processor 6 of each printer 1 includes a control program or software. This control program of the central processor 6 comprises a signal part, a first control part and a second control part. The signal part is provided for detecting an ON state of a request signal. This request signal is turned ON when a heater of any of the plurality of printers is currently turned ON. The first control part is provided for determining a delay time of transmitting a heat-on signal to a heater in accordance with the device number setting value of the switch 5, such that a timing with which a heat-on signal is supplied to a heater of the printer 1 being considered lags by the delay time behind a timing with which the zero cross signal is supplied by the detection circuit 4. And, the second control part is provided for transmitting a heat-on signal to the heater via the heater controller 7 at a timing defined by the delay time thus determined by the first control part, only when the request signal is turned OFF, thereby preventing two or more printers from being turned ON simultaneously.

Figure 2:
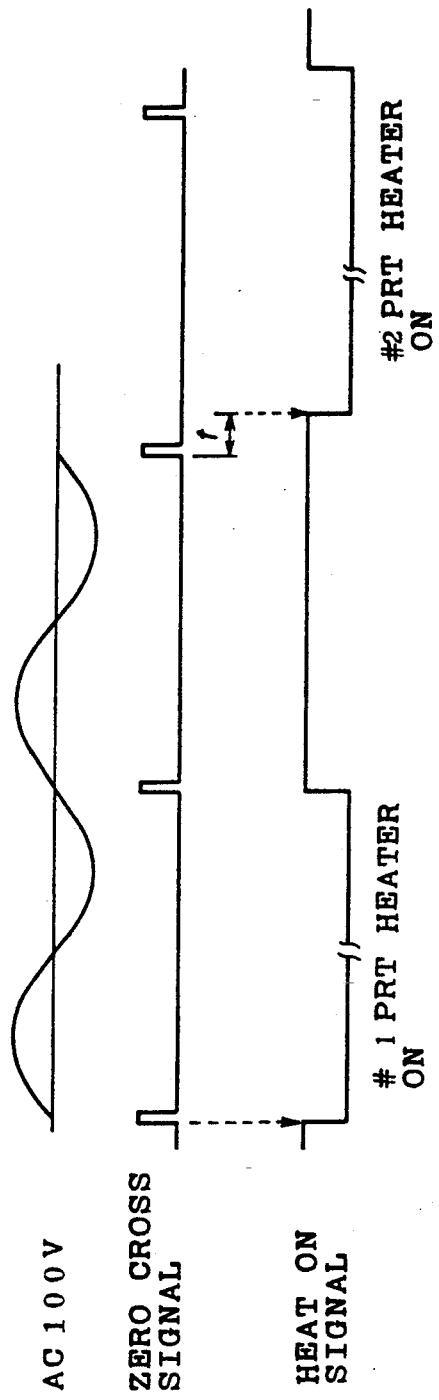
FIG. 2 is a timing chart for explaining the timing with which a power on signal is transmitted to a heater with different delay times, which is used by the heater control apparatus according to the present invention.

In accordance with the operating procedure described by this control program, the operating condition of the heater is controlled by the central processor 6 through the heater controller 7. According to the present invention, the above described delay time lagging behind a timing with which a heat-on signal is transmitted by the central processor 6 to the heater via the heater controller 7 is determined by this control program in accordance with the device number setting value of the switch 5. Conventionally, the timing with which a heat-on signal is transmitted to the heater substantially accords with the timing of occurrence of zero crossing of a voltage signal supplied from the a.c. power supply. However, according to the present invention, the timing with which a heat-on signal is transmitted to the heater lags by the thus determined delay time behind the timing of occurrence of zero crossing of the voltage signal, depending on the device number assigned to the printer being considered. This is illustrated in FIG.2.

According to the present invention, a request signal is turned ON/OFF by the central processor 6 simultaneously with a heat-on signal being transmitted by another printer to another heater of such a printer. If the central processor 6 of the printer 1 being considered checks that a request signal is already set to ON, before it transmits a heat-on signal to the heater, then the central processor 6 is set in a waiting condition and does not transmit a heat-on signal until the heating operation of another heater is ended and the request signal is turned by a central processor of another printer from ON to OFF. Therefore, it is possible to prevent two or more heaters of the plurality of printers from being turned ON simultaneously, and therefore no overload problem is rendered to the plurality of printers during operation.

In the case of the heater control apparatus according to the present invention, a plurality of printers 1 are connected one another via a plurality of coaxial cables 2. As these printers 1 are connected in common to the same power supply, a timer provided within the central processor 6 of each printer is started at the same time by a zero cross signal periodically supplied by the detection circuit 4 of edge printer 1 each time the zero crossing of the rated voltage signal from the power supply takes place. In accordance with the device number setting value of the switch 5 of each printer, the above described delay time is determined for each of the plurality of printers. On the basis of the delay time thus determined, the central processor 6 of each printer transmits a heat-on signal to the heater of the printer being considered. For example, in a case of the first printer #1 PRT as illustrated in FIG.1, the dip switches "a" to "c" of the switch 5 of this printer are all turned OFF. In accordance with this device number setting value of the switch 5, the delay time with respect to the first printer is determined as being equal to zero. That is, a heat-on signal is transmitted to the heater of the first printer #1 PRT simultaneously with the zero cross signal being supplied to the central processor 6 of the same printer. In a case of the second printer #2 PRT shown in FIG.1, the switch 5 of this printer is preset with the dip switch "a" turned ON and the dip switches "b" and "c" turned OFF. In accordance with this device number setting value of the switch 5, the delay time with respect to the second printer is determined as being equal to "t" ms (millisecond). In other words, the timing with which a heat-on signal is transmitted to the heater lags by this time period of "t" ms behind the timing of occurrence of zero crossing, as shown in FIG.2. Similarly, the delay time with respect to a third printer is determined as being equal to "2t" ms, and the delay time with respect to a fourth printer is determined as being equal to "3t" ms. In the foregoing description, it is assumed that the power supply supplying a rated supply voltage, which is, for example, equal to 100 V a.c., is installed in an office where the plurality of printers 1 connected to a host computer are used, and that a timing with which zero crossing of the supply voltage takes place in one printer is substantially the same as that in another printer. Therefore, it is possible to maintain the constant sequence of turning ON the heaters between the plurality of printers, by making use of the zero cross signal supplied in common to each printer. Thus, in the case of the heater control apparatus according to the present invention, there is no case in which two or more heaters of the printers are turned ON simultaneously.

Figure 3:
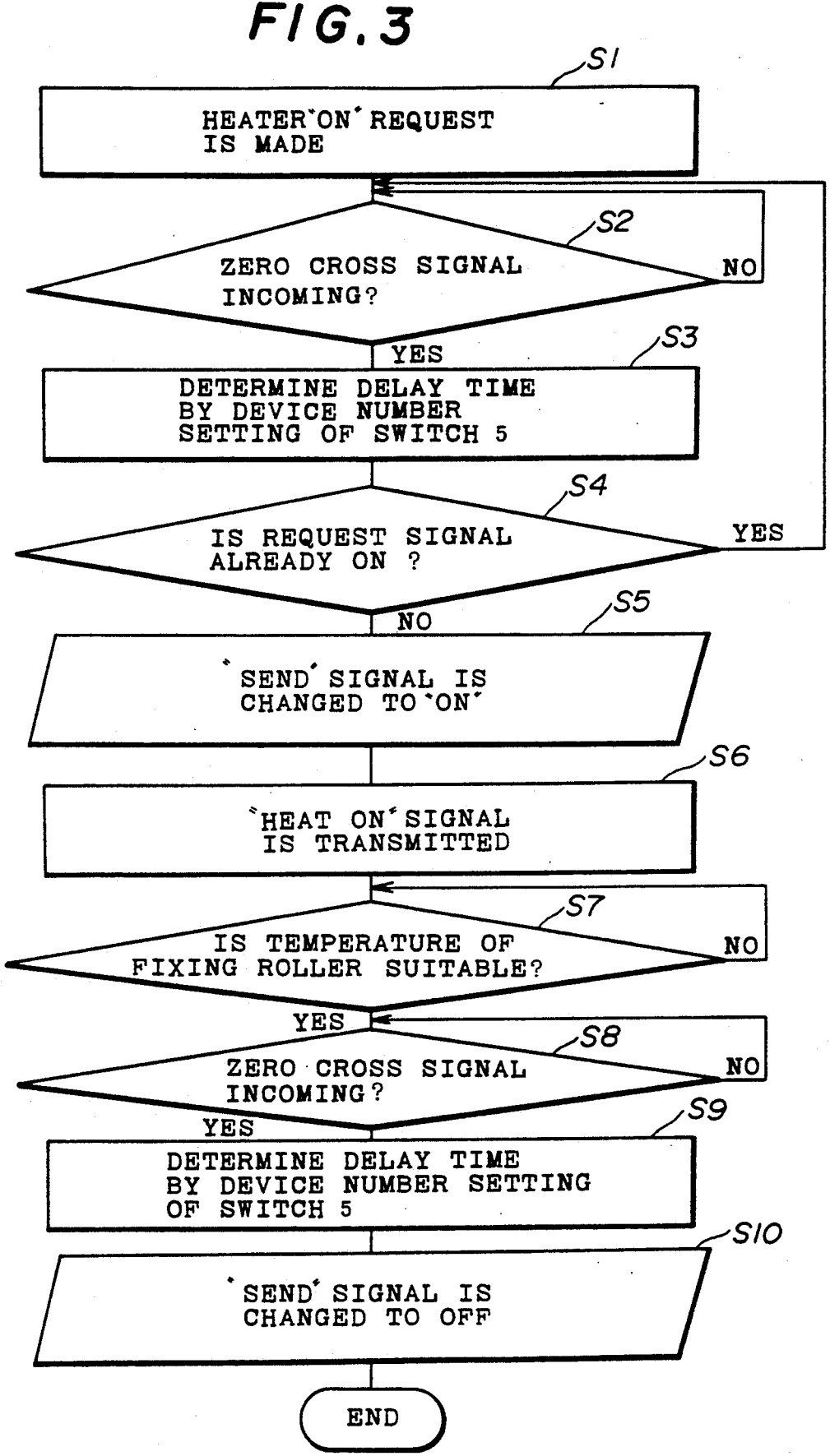
FIG.3 is a flow chart for explaining the operating procedure of the heater control apparatus according to the present invention.

Next, a description will be given of the operating procedure of the heater control apparatus according to the present invention, with reference to FIG.3. In a step S1 of a flow chart as illustrated in FIG.3, a heater "on" request is made by the central processor 6 in a controlled manner for turning ON the heater of the printer 1 being considered, and the central processor 6 is in a waiting condition in which a zero cross signal is awaited for being supplied to the central processor 6 from the detection circuit 4. In a step S2, a determination is made as to whether a zero cross signal is actually supplied to the central processor 6. While no zero cross signal is supplied, the central processor 6 remains in a waiting condition. Once a zero cross signal is supplied to the central processor 6, a delay time "t" of the printer 1 being considered is determined by the central processor 6 in accordance with the device number setting value of the switch 5 of the printer 1 being considered, in a step S3. According to the present invention, a timing with which a "heat on" signal is transmitted to the heater lags by the determined delay time "t" behind the timing of occurrence of zero crossing of a rated voltage signal. In a step S4, a determination is made as to whether or not the request signal is already set to ON. If the request signal is OFF, it is found that the heaters of other printers, different from the printer being considered, are currently turned OFF. Then, in a step S5, a "send" signal is changed to ON to present to other printers that the heater of the printer 1 being considered is now turned ON. Immediately, in a step S6, the central processor 6 transmits a "heat on" signal to the heater via the heater controller 7 so that the heater of this printer starts operation to heat the fixing roller thereof. And, if it is found in the step S4 that the request signal is already in the "ON" state, then a heater of any other printer is currently turned ON. According to the present invention, the heater of this printer 1 being considered still remains turned OFF until the operation of such a heater of another printer is ended and the request signal is reset to OFF. In a step S7, a determination is made as to whether a surface of the fixing roller is at a suitable temperature for operation of the printer 1, through the heating by the heater. If the temperature of the fixing roller rises to a suitable level, then the "send" signal is turned "OFF" (step S10) at a predetermined timing on the basis of prescribed procedures (steps S8, S9). Therefore, the heater control apparatus of the present invention allows the installation of a plurality of printers for use with a host computer, without rendering the overload problem due to two or more heaters being turned ON simultaneously. And, it is a matter of course that the heater control apparatus of the present invention is also applicable to a plurality of facsimile machines or copying machines connected to a host system installed in an office.

Further, the present invention is not limited to the above described embodiment, and variations and modifications may be made without departing from the scope of the present invention.

What is claimed is:

1. A heater control apparatus for use with a plurality of printers each having a heater, said heater control apparatus comprising:
   detection means for detecting occurrence of zero crossing of a voltage signal supplied from a power supply and for supplying a zero cross signal each time the zero crossing is detected;
   signal means for detecting an ON state of a request signal, said request signal being turned ON when a heater of any of said plurality of printers is currently turned ON;
   first control means for determining a delay time in accordance with a device number setting value assigned to each of the plurality of printers such that a timing with which a heat-on signal is transmitted to a heater of a subject printer among the plurality of printers lags by said determined delay time behind a timing with which said zero cross signal is supplied by said detection means; and
   second control means for supplying a heat-on signal to said heater of said subject printer at a timing defined by the determined delay time only when said request signal is currently turned OFF, thereby preventing two or more heaters from being turned ON simultaneously.

2. The apparatus as claimed in claim 1, further comprising switching means in which said device number setting value is predetermined depending on a device number assigned to each of the plurality of printers.

3. The apparatus as claimed in claim 1, wherein said second control means is in a waiting condition when said request signal is currently turned ON by another printer among said plurality of printers, said second control means supplying no heat-on signal to said heater of said subject printer until a heating operation of a heater of said another printer is ended and said request signal is turned OFF by said another printer.

4. The apparatus as claimed in claim 1, wherein said second control means does not transmit a heat-on signal to said heater of said subject printer while said request signal is turned ON, said request signal being turned ON by said another printer when a heater of said another printer is turned ON.

5. The apparatus as claimed in claim 1, wherein said plurality of printers are connected in common to a power supply, said power supply supplying a voltage signal to said detection means, the zero crossing of which is detected by said detection means.

6. The apparatus as claimed in claim 1, wherein each of said plurality of printers is coupled with another printer by a common signal line, said request signal being transmitted through said common signal line.

7. The apparatus as claimed in claim 1, wherein said delay time of a printer among said plurality of printers, determined by said first control means, differs from those of other printers.

8. The apparatus as claimed in claim 2, wherein said device number setting value of said switching means is arbitrarily predetermined for each of said plurality of printers.

9. A heater control apparatus for use with a plurality of printers each having a heater and a device number assigned to each of the plurality of printers, said heater control apparatus comprising:

switching means for identifying each one of the plurality of printers by using a device number setting value which is predetermined in accordance with the device number assigned to each of the printers;

detection means for detecting occurrence of zero crossing of a voltage signal supplied from an alternating current power supply and for supplying a zero cross signal each time the occurrence of zero crossing is detected;

signal means for detecting an ON state of a request signal, said request signal being turned ON when a heater of any one of said plurality of printers is currently turned ON;

first control means for determining a delay time with respect to each of the printers in accordance with the device number setting value of each of the plurality of printers such that a timing with which a heat-on signal is transmitted to a heater of a first printer among the plurality of printers lags by said determined delay time behind a timing with which said zero cross signal is supplied by said detection means; and second control means for supplying a heat-on signal to said heater of said first printer at a timing defined by the determined delay time only when said request signal is currently turned OFF, thereby preventing two or more heaters from being turned ON simultaneously, wherein said second control means is in a waiting condition when said request signal is already turned ON due to an ON state of a heater of a second printer among the plurality of printers, said second control means supplying no heat-on signal to said heater of said first printer until operation of the heater of said second printer is finished and said request signal is turned OFF due to an OFF state of the heater of said second printer.

10. The apparatus as claimed in claim 9, wherein said second control means does not transmit a heat-on signal to said heater of said subject printer while said request signal is turned ON, said request signal being turned ON by said another printer when a heater of said another printer is turned ON.

11. The apparatus as claimed in claim 9, wherein said plurality of printers are connected in common to a power supply, said power supply supplying a voltage signal to said detection means, the zero crossing of which is detected by said detection means.

12. The apparatus as claimed in claim 9, wherein each of said plurality of printers is coupled with another printer by a common signal line, said request signal being transmitted through said common signal line.

13. The apparatus as claimed in claim 9, wherein said delay time of a printer among said plurality of printers, determined by said first control means, differs from those of other printers.

14. The apparatus as claimed in claim 9, wherein said device number setting value of said switching means is arbitrarily predetermined for each of said plurality of printers.

* * * * *